(12) United States Patent
Kim et al.

(10) Patent No.: US 11,953,335 B2
(45) Date of Patent: Apr. 9, 2024

(54) ROBOT

(71) Applicant: LG ELECTRONICS INC., Seoul (KR)

(72) Inventors: Hyoungmi Kim, Seoul (KR); Yu June Jang, Seoul (KR); Jin Won Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 668 days.

(21) Appl. No.: 17/025,951

(22) Filed: Sep. 18, 2020

(65) Prior Publication Data

US 2021/0102817 A1 Apr. 8, 2021

(30) Foreign Application Priority Data

Oct. 4, 2019 (KR) .................. 10-2019-0123204

(51) Int. Cl.
| | | |
|---|---|---|
| *G01C 21/34* | (2006.01) | |
| *G01G 19/08* | (2006.01) | |
| *G06Q 10/047* | (2023.01) | |
| *G06Q 10/0631* | (2023.01) | |
| *G06Q 10/0835* | (2023.01) | |

(52) U.S. Cl.
CPC ......... *G01C 21/3453* (2013.01); *G01G 19/08* (2013.01); *G06Q 10/047* (2013.01); *G06Q 10/06315* (2013.01); *G06Q 10/08355* (2013.01)

(58) Field of Classification Search
CPC .. G01C 21/3453; G01G 19/08; G06Q 10/047; G06Q 10/06315; G06Q 10/08355
USPC ............................................ 701/25
See application file for complete search history.

(56) References Cited

U.S. PATENT DOCUMENTS

| | | | | |
|---|---|---|---|---|
| 10,479,418 | B1* | 11/2019 | Patel | B65D 90/0066 |
| 11,493,345 | B1* | 11/2022 | Williams | H04W 4/44 |
| 2015/0095256 | A1* | 4/2015 | Martin | G06Q 10/08355 |
| | | | | 705/338 |
| 2018/0211219 | A1* | 7/2018 | Scott | G06Q 10/047 |
| 2019/0228375 | A1* | 7/2019 | Laury | G05D 1/0088 |
| 2020/0023765 | A1* | 1/2020 | Lee | G06Q 10/0838 |
| 2020/0090117 | A1* | 3/2020 | Luo | G06Q 10/083 |
| 2020/0090121 | A1* | 3/2020 | Gupta | G06Q 50/28 |
| 2020/0354057 | A1* | 11/2020 | Polus | B64D 1/12 |
| 2020/0364663 | A1* | 11/2020 | Colella | G06Q 10/08355 |
| 2020/0401995 | A1* | 12/2020 | Aggarwala | G06Q 10/0838 |
| 2021/0090023 | A1* | 3/2021 | Sasidharan | G06Q 10/0838 |
| 2021/0362335 | A1* | 11/2021 | Kim | B25J 9/0009 |
| 2022/0004974 | A1* | 1/2022 | Heinla | G05D 1/021 |
| 2022/0317698 | A1* | 10/2022 | Sibley | B66F 9/063 |
| 2022/0364866 | A1* | 11/2022 | Williams | G01C 21/3492 |
| 2023/0062293 | A1* | 3/2023 | Williams | G08G 1/202 |

FOREIGN PATENT DOCUMENTS

| | | |
|---|---|---|
| KR | 10-2018-0123298 A | 11/2018 |
| KR | 10-2019-0096007 A | 8/2019 |

* cited by examiner

*Primary Examiner* — Krishnan Ramesh

(74) *Attorney, Agent, or Firm* — Birch, Stewart, Kolasch & Birch, LLP

(57) ABSTRACT

The present disclosure relates to a robot configured to determine a delivery priority among a plurality of destinations based on weight information of an article, and a delivery method using such a robot. The robot may communicate with other electronic devices and a server in a 5G communication environment.

16 Claims, 7 Drawing Sheets

ROBOT

CROSS-REFERENCE TO RELATED APPLICATION

Pursuant to 35 U.S.C. § 119(a), this application claims the benefit of an earlier filing date of and the right of priority to Korean Patent Application No. 10-2019-0123204, entitled "ROBOT," filed before KIPO on Oct. 4, 2019, and the entire disclosure of which is incorporated herein by reference.

BACKGROUND

1. Technical Field

The present disclosure relates to a robot, and more particularly, to a robot configured to determine a delivery priority among a plurality of destinations based on weight information of articles, and to a delivery method using such a robot.

2. Description of Related Art

In recent years, robots have been used to transport articles in various places. Robots may load and transport articles in indoor spaces such as airports and hospitals, or may provide delivery services involving outdoor travel, such as a parcel delivery service.

Related art 1 (Korean Patent Publication No. 10-2019-0096007A) discloses a mobile robot device configured to transport an article from a workplace to a specific delivery location. To this end, the mobile robot device in related art 1 recognizes lines marked on the floor using an infrared sensor, and moves along the recognized lines.

Related art 2 (Korean Patent Publication No. 10-2018-0123298A) discloses a delivery robot device configured to deliver an article, collected in a delivery area by a delivery person, to a final destination. To this end, the delivery robot device in related art 2 communicates with a service server and a terminal of the recipient.

However, the robot in related art 1 moves only along the designated route that can be recognized by an infrared sensor. Similarly, the robot in related art 2 returns to a standby place after performing a single delivery. That is, related art 2 does not suggest or disclose a method of controlling the robot to visit a plurality of destinations. Further, a method of controlling the amount of power required to drive the robot is not suggested or disclosed in related art 1 or related art 2.

SUMMARY OF THE INVENTION

An aspect of the present disclosure is to provide a robot configured to sequentially visit a plurality of destinations.

Another aspect of the present disclosure is to provide a robot control method for determining a delivery priority in consideration of the amount of power consumption.

A further aspect of the present disclosure is to provide a robot configured to determine a loading position that is suitable for the characteristics of an article.

Still another aspect of the present disclosure is to provide a robot control method for determining the weights of articles based on a series of loading operations and on a change in weight.

The present disclosure is not limited to what has been described above, and other aspects not mentioned herein will be apparent from the following description to one of ordinary skill in the art to which the present disclosure pertains.

An embodiment of the present disclosure provides a robot configured to determine a delivery priority in consideration of the amount of power consumption when determining a route along which the robot is to sequentially visit a plurality of destinations.

To this end, the robot according to the embodiment may include a container including at least one loading space, a weight sensor configured to detect the load weight of the container, a memory configured to store the weight information of an article loaded in the loading space, and a processor. The processor may be set to determine the weight information based on the load weight, and to determine a route along which the robot is to visit a plurality of destinations based on the weight information.

An embodiment of the present disclosure provides a delivery method using a robot, which determines a route along which the robot is to sequentially visit a plurality of destinations in consideration of the weights of articles determined based on a series of loading operations and on a change in weight.

To this end, the delivery method using a robot according to the embodiment may include loading an article in a container of the robot, obtaining the load weight of the container, determining weight information of the article based on the load weight, and determining a route along which the robot is to visit a plurality of destinations based on the weight information of the article.

Aspects which can be achieved by the present disclosure are not limited what has been disclosed hereinabove and other aspects can be clearly understood from the following description by those skilled in the art to which the present disclosure pertains.

As is apparent from the above description, according to the embodiment of the present disclosure, since a delivery priority is determined in consideration of the weights of articles, energy-efficient delivery may be realized.

According to the embodiment of the present disclosure, since a robot automatically indicates, to the user, a loading position that is suitable for an article, the convenience to the user may be improved.

According to the embodiment of the present disclosure, since the weight information of articles is measured using only a single weight sensor, the manufacturing costs of a robot may be reduced.

It should be noted that effects of the present disclosure are not limited to the effects of the present disclosure as mentioned above, and other unmentioned effects of the present disclosure will be clearly understood by those skilled in the art from the embodiment described above.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
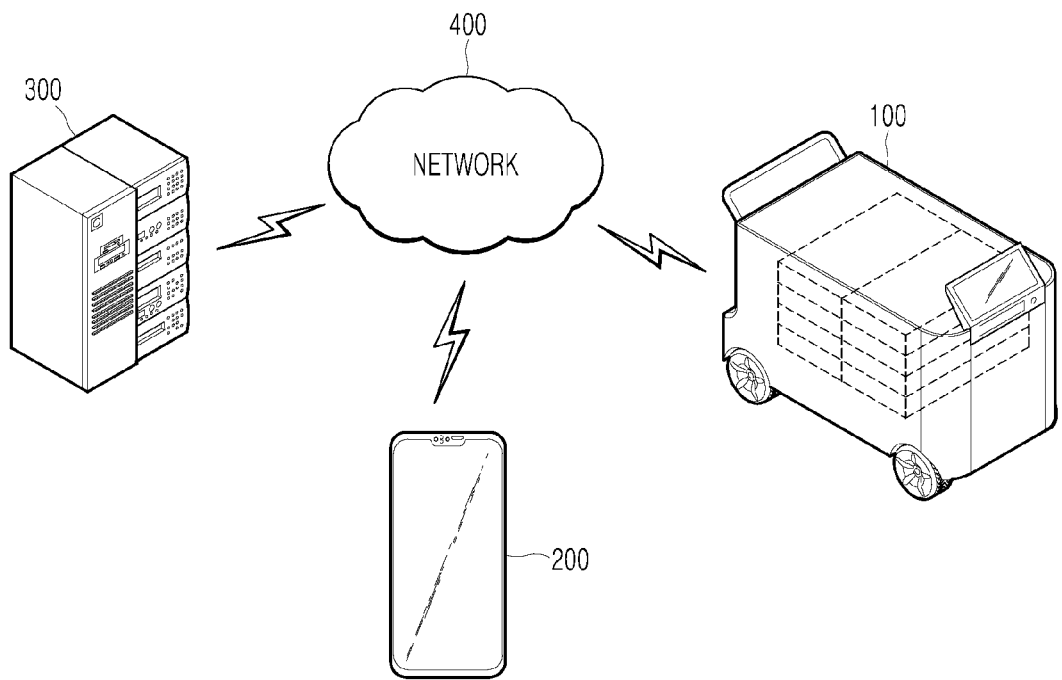
FIG. 1 is an exemplary diagram of a robot control environment according to an embodiment of the present disclosure.

Hereinafter, embodiments disclosed herein will be described in detail with reference to the accompanying drawings, and the same reference numerals are given to the same or similar components and duplicate descriptions thereof will be omitted. In addition, in describing an embodiment disclosed in the present document, if it is determined that a detailed description of a related art incorporated herein unnecessarily obscure the gist of the embodiment, the detailed description thereof will be omitted.

The terminology used herein is used for the purpose of describing particular exemplary embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," " "second," and other numerical terms, are used only to distinguish one element from another element. These terms are generally only used to distinguish one element from another.

FIG. 1 is an exemplary diagram of a robot control environment according to an embodiment of the present disclosure.

A robot control environment may include a robot 100, a terminal 200, a server 300, and a network 400 configured to connect the above components.

Referring to FIG. 1, the robot control environment may include a robot 100, a terminal 200, a server 300, and a network 400. Various electronic devices other than the devices shown in FIG. 1 may be interconnected through the network 400 and operated.

The robot 100 may refer to a machine which automatically handles a given task by its own ability, or which operates autonomously. In particular, a robot having a function of recognizing an environment and performing an operation according to its own judgment may be referred to as an intelligent robot.

The robot 100 may be classified into industrial, medical, household, and military robots, according to the purpose or field of use.

The robot 100 may include an actuator or a driver including a motor in order to perform various physical operations, such as moving joints of the robot. Moreover, a movable robot may include, for example, a wheel, a brake, and a propeller in the driving unit thereof, and through the driving unit may thus be capable of traveling on the ground or flying in the air.

By employing AI technology, the robot 100 may be implemented as a guide robot, a transport robot, a cleaning robot, a wearable robot, an entertainment robot, a pet robot, or an unmanned flying robot.

The robot 100 may include a robot control module for controlling its motion. The robot control module may correspond to a software module or a chip that implements the software module in the form of a hardware device.

Using sensor information obtained from various types of sensors, the robot 100 may obtain status information of the robot 100, detect (recognize) the surrounding environment and objects, generate map data, determine a movement route and drive plan, determine a response to a user interaction, or determine an operation.

Here, in order to determine the movement route and drive plan, the robot 100 may use sensor information obtained from at least one sensor among LiDAR, radar, and a camera.

The robot 100 may perform the operations above by using a trained model configured by at least one artificial neural network. For example, the robot 100 may recognize the surrounding environment and objects by using the trained model, and determine its operation by using the recognized surrounding environment information or object information. Here, the trained model may be trained by the robot 100 itself or trained by an external device such as the server 300.

At this time, the robot 100 may perform the operation by generating a result by employing the trained model directly, but may also perform the operation by transmitting sensor information to an external device such as the server 300 and receiving a result generated accordingly.

The robot 100 may determine the movement route and drive plan by using at least one of object information detected from the map data and sensor information or object information obtained from an external device, and drive according to the determined movement route and drive plan by controlling its locomotion platform.

The map data may include object identification information about various objects disposed in the space in which the robot 100 drives. For example, the map data may include object identification information about static objects such as wall and doors and movable objects such as a flowerpot and a desk. In addition, the object identification information may include the name, type, distance, location, and so on.

Also, the robot 100 may perform the operation or drive by controlling its locomotion platform based on the control/interaction of the user. At this time, the robot 100 may obtain intention information of the interaction according to the user's motion or spoken utterance, and perform an operation by determining a response based on the obtained intention information.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The artificial neural network may include an input layer, an output layer, and optionally one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an artificial neural network is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training the artificial neural network with training data that has been given a label. In addition, the label may refer to a target answer (or a result value) to be inferred by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The terminal 200 is an electronic device operated by a user or an operator, and the user may drive an application for controlling the robot 100, or may access an application installed in an external device, including the server 300, using the terminal 200. The user may transmit an article delivery request to the robot 100 or the server 300 using the application installed in the terminal 200. The robot 100 or the server 300 that receives the article delivery request may assign a robot 100 to deliver the article, and may order the robot 100 to move to a place at which to receive the article to deliver.

The terminal 200 may receive state information of the robot 100 from the robot 100 and/or the server 300 through the network 400. For example, the state information of the robot 100 may include such information as the current position of the robot 100, a predicted movement route to a destination, information on whether the robot 100 has arrived at a destination, and an expected time of arrival at a destination.

The terminal 200 may provide a function of monitoring the robot 100 through the application installed therein to the user.

The terminal 200 may include a communication terminal capable of performing a function of a computing device (not shown). Here, the terminal 200 may be, but is not limited to, a desktop computer, a smartphone, a laptop computer, a tablet PC, a smart TV, a cellular phone, a personal digital assistant (PDA), a media player, a micro-server, a global positioning system (GPS) device, an electronic book terminal, a digital broadcasting terminal, a navigation device, a kiosk, an MP3 player, a digital camera, an electric home appliance, or any of other mobile or immobile computing devices configured to be manipulated by a user. In addition, the terminal 200 may be a wearable device having a communication function and a data processing function, such as a watch, glasses, a hair band, or a ring. The terminal 200 is not limited to the above, and any terminal capable of performing web browsing may be used without limitation.

The server 300 may include a web server or an application server, which is capable of receiving a delivery request from the terminal 200 and assigning a robot 100 for implementing the received delivery request. In addition, the server 300 may include a web server or an application server, which is capable of monitoring the robot 100 using the application or the web browser installed in the terminal 200. The server 300 may be a database server that provides big data necessary for applying various artificial intelligence algorithms and data relating to a robot control.

The network 400 may serve to connect the robot 100, the terminal 200, and the server 300 to each other. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 400 may transmit/receive information using short-range communications and/or long-distance communications. Short-range communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as Internet and a private network such as a secure corporate private network, for example, a multiple network environment. Access to the network 400 can be provided via one or more wired or wireless access networks. Furthermore, the network 400 may support the Internet of things (IoT) for 5G communication or exchanging and processing information between distributed elements such as objects.

Figure 2:
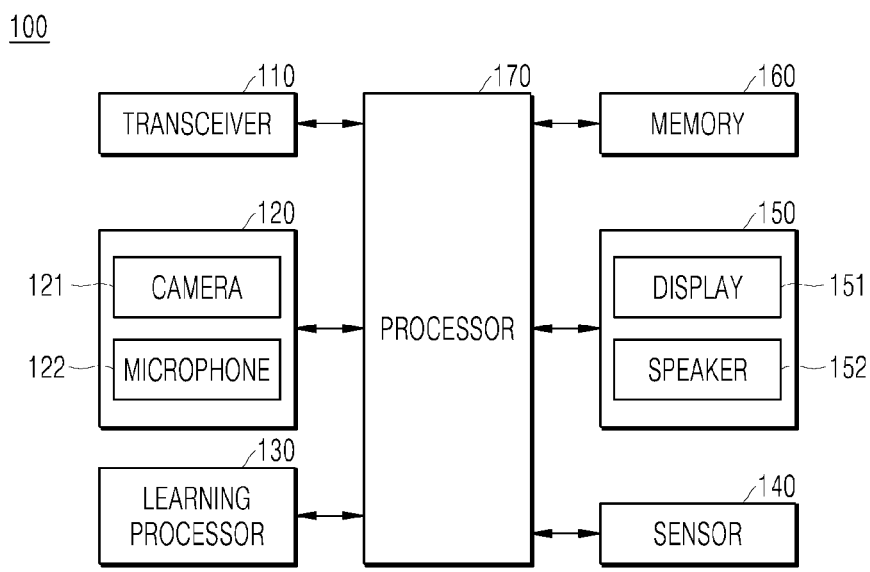
FIG. 2 is a block diagram of a robot according to an embodiment of the present disclosure.

FIG. 2 is a block diagram of a robot according to an embodiment of the present disclosure.

The robot 100 may include a transceiver 110, an input interface 120, a learning processor 130, a sensor 140, an output interface 150, a memory 160, a processor 170, and the like. However, the components illustrated in FIG. 2 are not essential for implementing the robot 100, and the robot 100 described herein may have more or fewer components than those listed above.

The transceiver 110 may transmit and receive data with external devices such as other AI devices or the server 300 by using wired or wireless communication technology. For example, the communicator 110 may transmit or receive sensor data, user input, a trained model, a control signal, and the like with the external devices. The AI device may also, for example, be realized by a stationary or a mobile device, such as a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set top box (STB), a DMB receiver, a radio, a washer, a refrigerator, digital signage, a robot, or a vehicle.

The communication technology used by the transceiver 110 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC). The transceiver 110 may include a transmitter, a receiver, a transceiver, a modem, a port, a controller, and an antenna in order to perform a function of transmitting and receiving data for various types of communication.

The transceiver 110 may receive an article delivery request under the control of the processor 170. For example, the transceiver 110 may receive a request for delivering an article from a departure point to a destination under the control of the processor 170.

The input interface 120 may obtain various types of data. Accordingly, the input interface 120 may include, for example, a camera 121 for inputting an image signal, a microphone 122 for receiving an audio signal, and a keyboard/keypad (not shown) for receiving information from the user. Here, the camera 121 or the microphone 122 may be regarded as a sensor, and therefore a signal acquired from the camera 121 or the microphone 122 may be sensing data or sensor information. The camera 121 may obtain an image of an article to be loaded on the robot 100 under the control of the processor 170.

The input interface 120 may obtain, for example, learning data for model learning and input data used when output is obtained using a trained model. The input interface 120 may obtain raw input data. Accordingly, the processor 170 or the learning processor 130 may extract an input feature by preprocessing the input data.

The learning processor 130 may allow a model, composed of an artificial neural network, to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion. For example, the trained model may be installed in the server 200 or in the robot 100, and may be used to recognize the loading characteristics of an article. For example, the trained model may be installed in the server 200 or in the robot 100 and may be used to determine an optimal route.

At this time, the learning processor 130 may perform AI processing together with a learning processor 320 of the server 300.

At this time, the learning processor 130 may include a memory integrated with or implemented in the robot 100. Alternatively, the learning processor 130 may also be implemented by using a memory 160, an external memory directly coupled to the robot 100, or a memory held in an external device.

The sensor 140 may acquire at least one of internal information of the robot 100, surrounding environment information of the robot 100, or user information by using various sensors. The sensor 140 may include one or more sensors.

The sensor 140 may include, for example, a weight sensor, a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, or a a light detection and ranging (LiDAR) sensor, radar. The weight sensor may detect the load weight of a container of the robot 100 under the control of the processor 170. In one example, the weight sensor may be disposed at the bottom of the container of the robot 100.

The sensor 140 may acquire various kinds of data, such as learning data for model learning and input data used when an output is acquired using a trained model. The sensor 140 may obtain raw input data. Accordingly, the processor 170 or the learning processor 130 may extract an input feature by preprocessing the input data.

The output interface 150 may generate a visual, auditory, or tactile related output.

The output interface 150 may include a display 151 outputting visual information, a speaker 152 outputting auditory information, and a haptic module (not shown) outputting tactile information.

The memory 160 may store data supporting various functions of the robot 100. For example, the memory 160 may store input data obtained by the input interface 120, sensor information obtained by the sensor 140, learning data, a trained model, and a learning history.

The memory 160 may store map data. The memory 160 may store weight information of an article loaded in the loading space. The memory 160 may store a loading position and weight information of each article to be delivered. The memory 160 may store a plurality of pieces of destination information. The memory 160 may store predetermined reference floor information and a plurality of pieces of vertical zone information for each outdoor place. The memory 160 may store the final vertical movement route. The memory 160 may store route information determined for visiting a plurality of destinations. The memory 160 may store the actual driving result. The memory 160 may further store an article-recognizing model. In addition, the memory 160 may store a route model.

The memory 160 may include, but is not limited to, magnetic storage media or flash storage media. This memory 160 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The processor 170 is a type of a central processor unit which may drive control software provided in the memory 160 to control overall operation of the robot 100. The processor 170 may include all kinds of devices capable of processing data. Here, the processor 170 may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), a field programmable gate array (FPGA), and the like may be included, but the scope of the present disclosure is not limited thereto. The processor 170 may include one or more processors.

The processor 170 may determine at least one executable operation of the robot 100, based on information determined or generated using a data analysis algorithm or a machine learning algorithm. In addition, the processor 170 may control components of the robot 100 to perform the determined operation.

To this end, the processor 170 may request, retrieve, receive, or use data of the learning processor 130 or the memory 160, and may control components of the robot 100 to execute a predicted operation or an operation determined to be preferable of the at least one executable operation.

At this time, if the connection of the external device is required to perform the determined operation, the processor 170 may generate a control signal for controlling the corresponding external device, and transmit the generated control signal to the corresponding external device.

The processor 170 may obtain intent information regarding a user input, and may determine a requirement of a user based on the obtained intent information.

The processor 170 may acquire the intention information corresponding to the user input by using at least one of a speech-to-text (STT) engine for converting speech input into a text string, or a natural-language-processing (NLP) engine for acquiring intent information of a natural language.

In an embodiment, the at least one of the STT engine or the NLP engine may be composed of artificial neural networks, some of which are trained according to a machine learning algorithm. In addition, the at least one of the STT engine or the NLP engine may be trained by the learning processor 130, trained by a learning processor 320 of an server 300, or trained by distributed processing thereof.

The processor 170 may collect history information including, for example, operation contents and user feedback on an operation of the robot 100, and store the history information in the memory 160 or the learning processor 130, or may transmit the history information to an external device such as a server 300. The collected history information may be used to update a trained model.

The processor 170 may control at least some of components of the robot 100 to drive an application stored in the memory 160. Furthermore, the processor 170 may operate two or more components included in the robot 100 in combination with each other to drive the application.

The processor 170 may be configured to determine the weight information of the article loaded in the loading space based on the load weight of the container of the robot 100, and to determine the route along which the robot 100 is to visit a plurality of destinations based on the weight information of the article.

The processor 170 may be configured to determine a loading space to load the article therein based on the loading characteristics of the article. The processor 170 may be configured to determine the loading characteristics of the article based on the image of the article obtained by controlling the camera 121. The processor 170 may be set to re-determine the loading space to load the article therein based on the weight information of the article.

The container of the robot 100 may include at least one loading space, and each loading space may include at least one door. The processor 170 may be configured to determine the change in the load weight of the container before opening the door of the loading space and after closing the door. In response to the load weight changing, the processor 170 may be configured to determine the loading space, the door of which is opened and closed, to be the loading position of the article. The processor 170 may be configured to determine the change in the load weight to be the weight information of the article.

Figure 3:
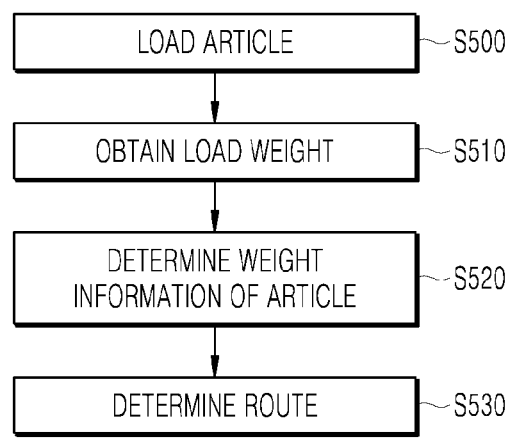
FIG. 3 is a flowchart of a delivery method using a robot according to an embodiment of the present disclosure.

FIG. 3 is a flowchart of a delivery method using the robot according to an embodiment of the present disclosure.

The delivery method according to the embodiment includes loading an article in the container of the robot 100 (S500), obtaining the load weight of the container (S510), determining the weight information of the article based on the load weight, and determining a route along which the robot 100 is to visit a plurality of destinations based on the weight information of the article (S530).

In step S500, the robot 100 may load an article to be delivered in the container of the robot 100. For example, the user may put an article into the container of the robot 100. For example, the robot 100 may directly put an article into the container thereof. For example, a robot having a robot arm may put an article to be delivered by the robot 100 into the container of the robot 100.

The robot 100 may include a container for storing an article therein. The container may include at least one loading space. Each loading space may store one article or a plurality of articles. The container may be provided in the robot 100 in an integral form or in a separable form.

The loading space of the robot 100 may have various sizes and shapes. The robot 100 may indicate, to the user, an optimal loading space suitable for the loading characteristics of the article, such as the size and type of the article. This may enable stable transportation of the article and may improve user convenience.

To this end, the robot 100 may determine a loading space to load the article therein based on the loading characteristics of the article using the processor 170 in step S500. To this end, step S500 may include a step of obtaining the image of the article using the camera 121, a step of determining the loading characteristics of the article based on the obtained image of the article, and a step of determining a loading space to load the corresponding article therein, among one or more loading spaces in the container, based on the determined loading characteristics.

Specifically, in step S500, the robot 100 may obtain the image of the article to be loaded using the camera 121 under the control of the processor 170.

In addition, in step S500, the processor 170 may determine the loading characteristics of the article based on the obtained image of the article. Here, the loading characteristics of the article are characteristics determined based on the external appearance of the article in terms of storage of the article, and may include the size, shape, and type of the article. For example, in step S500, the processor 170 may recognize the size and shape of the article from the image of the article. In one example, the robot 100 may store an article-recognizing model in the memory 160, and the processor 170 may determine the loading characteristics of the article using the article-recognizing model stored in the memory 160.

In step S500, the robot 100 may determine a loading space to load the corresponding article therein, among one or more loading spaces in the container, based on the loading characteristics of the article determined in the previous step under the control of the processor 170. The robot 100 may indicate, to the user, the loading space determined to be suitable for the loading characteristics of the article, and may automatically open and close the corresponding loading space.

Hereinafter, an exemplary article-loading process will be described with reference to FIGS. 4 and 5.

Figure 4:
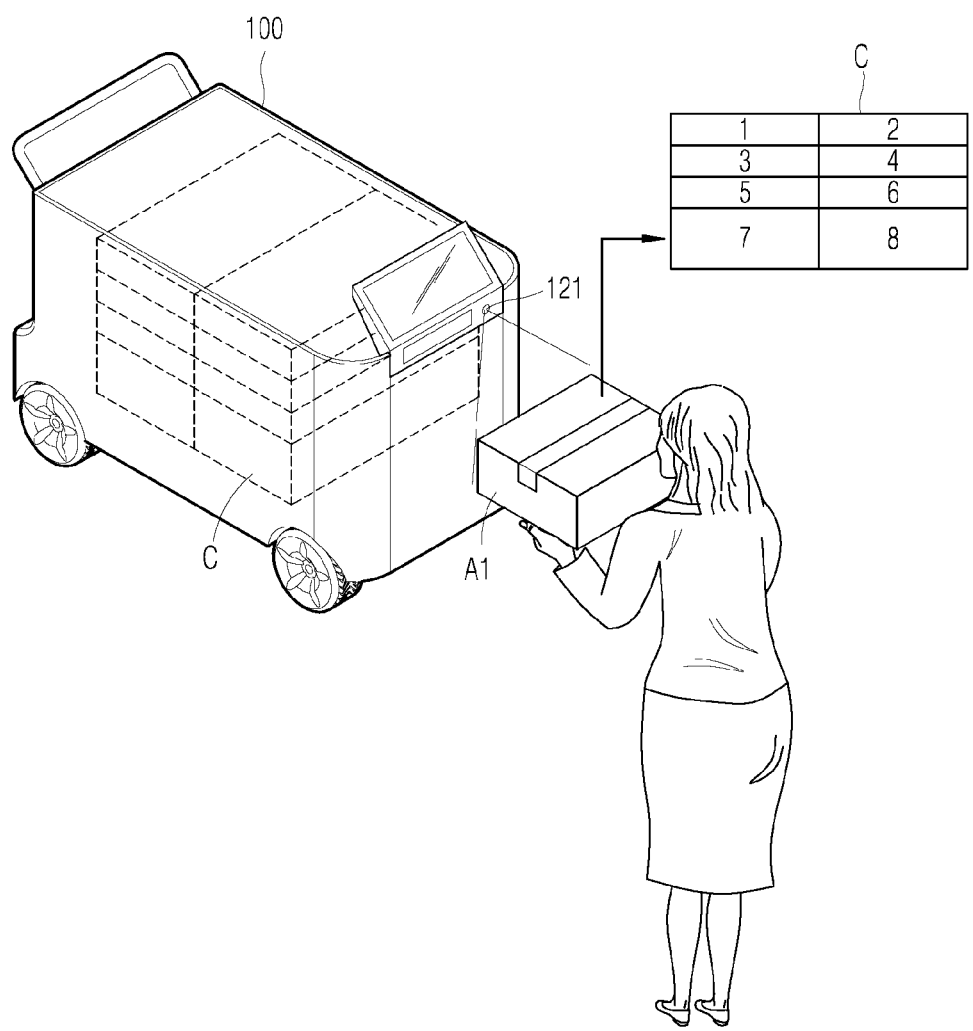
FIG. 4 is a diagram for illustrating loading of an article according to an embodiment of the present disclosure.

FIG. 4 is a diagram for illustrating the loading of an article according to an embodiment of the present disclosure.2

The robot 100 may include a container C, and the container C may include at least one loading space (for example, loading spaces 1 to 8). In step S500 shown in FIG. 3, the user may show an article A1 to the camera 121 of the robot 100, and the robot 100 may capture an image of the article A1 using the camera 121 under the control of the processor 170. The processor 170 may determine the loading characteristics of the article A1, such as the size and shape of the article, from the image of the article A1 using the article-recognizing model stored in the memory 160, and may indicate, to the user, a loading space (for example, the loading space 7) suitable for the loading characteristics of the article. In addition, the robot 100 may automatically open the loading space (that is, the loading space 7) so that the user may load the article A1 therein.

Figure 5:
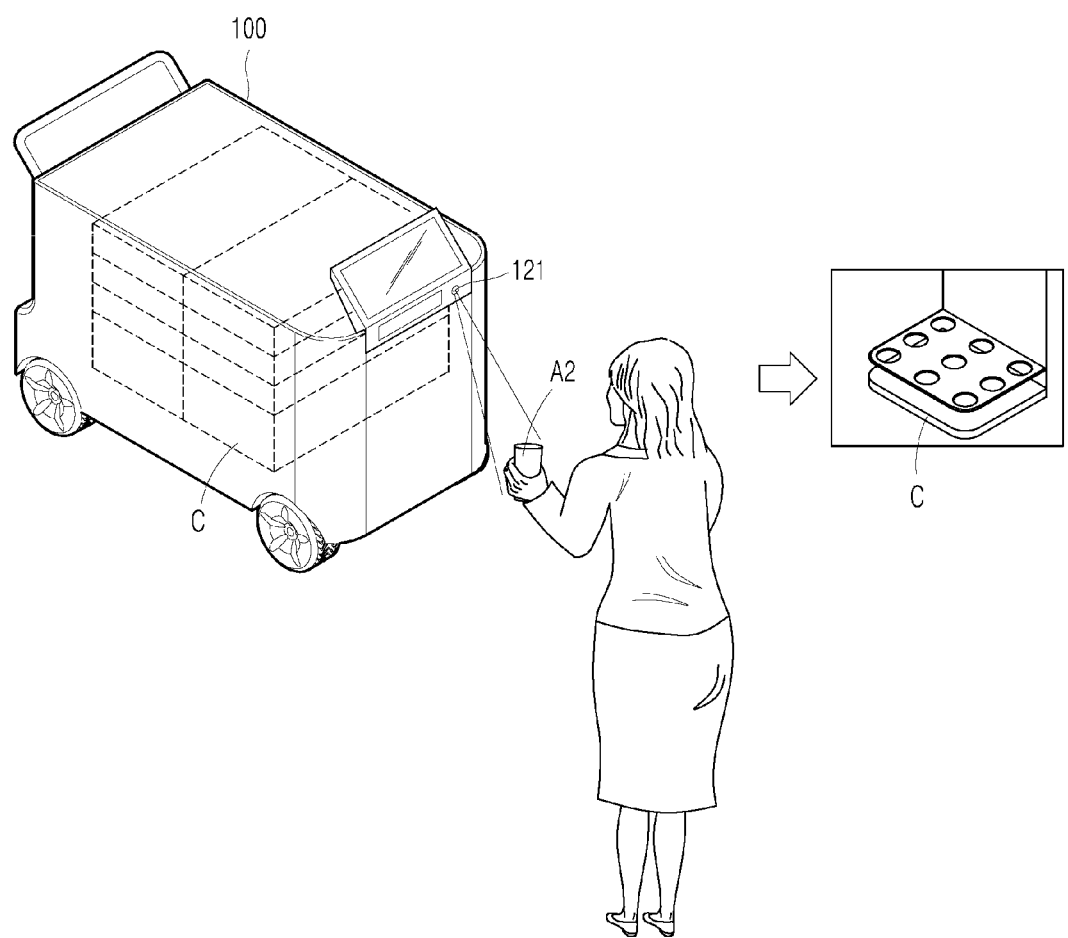
FIG. 5 is a diagram for illustrating loading of an article according to an embodiment of the present disclosure.

FIG. 5 is a diagram for illustrating the loading of an article according to an embodiment of the present disclosure.

The container C of the robot 100 may include at least one loading space, and each loading space may store at least one article therein. In step S500 shown in FIG. 3, the user may show an article A2 to the camera 121 of the robot 100, and the robot 100 may capture an image of the article A2 using the camera 121 under the control of the processor 170. The processor 170 may determine the loading characteristics of the article A2, such as the type of the article, from the image of the article A2 using the article-recognizing model stored in the memory 160, and may indicate, to the user, a loading space suitable for the loading characteristics of the article for example, a loading space provided with a holder for fixing the article). For example, the type of article may include information on care and handling during delivery. For example, the type of article may be determined according to the information on care and handling, and may include articles such as an article that should not be turned upside down or excessively shaken, such as a cup containing a beverage, an article contained in a fragile container, or a hot article. In addition, the robot 100 may automatically open the loading space so that the user may load the article A2 therein.

Referring back to FIG. 3, the robot 100 may again determine a loading space to load an article therein based on the weight information of the article using the processor 170. To this end, the delivery method according to the embodiment may further include a step of re-determining a loading space to load an article therein based on the weight information determined in step S520 with respect to the article loaded in step S500. Thus, if there is a concern that the weight of the article determined in step S520 after loading the article in step S500 is so great that the robot 100 may not stably travel, the robot 100 may re-determine a loading space in which to load the corresponding article to enable stable travel, and may indicate the same to the user.

In addition, step (S500) may further include a step of taking an article out of the container. For example, when the robot 100 arrives at the destination, the robot 100 may open a loading space in which an article to be delivered to the destination is stored so that the user may take out the article.

Referring back to FIG. 3, step S510 to step S530 will be described below.

In step S510, the robot 100 may obtain the load weight of the container through the sensor 140 under the control of the processor 170. The load weight is the total weight of the articles loaded in the container. That is, the load weight is the sum of the weights of one or more articles loaded in one or more loading spaces in the container.

The processor 170 may obtain the load weight of the container by controlling a weight sensor, which constitutes the sensor 140. In one example, the weight sensor may be disposed at the bottom of the container of the robot 100. In one example, the robot 100 may detect the load weight before an article is loaded and the load weight after an article is loaded in step S500 under the control of the processor 170.

In step S520, the robot 100 may determine the weight information of the article loaded in step S500 based on the load weight obtained in step S510 using the processor 170. The weight information of the article includes a numerical value representing the weight of the article.

In one example, the robot 100 may determine the weight information of the article in step S520 according to the change in the load weight before and after loading the article. For example, the weight of the article loaded in the step S500 may correspond to the difference between the load weight of the container of the robot 100 before loading the article in step S500 and the load weight of the container of the robot 100 after loading the article in step S500. For example, in response to the article being loaded in the container in step S500, the load weight increases by an amount equivalent to the weight of the article. For example, in response to the article being taken out of the container in step S500, the load weight decreases by an amount equivalent to the weight of the article.

In one example, each loading space of the robot 100 may include at least one door, and the robot 100 may determine the change in the load weight according to the opened or closed state of the door of each loading space. Here, the robot 100 may detect the load weight using the weight sensor, which constitutes the sensor 140, under the control of the processor 170, and may determine the change in the load weight.

The robot 100 may determine the change in the load weight before opening the door of each loading space and after closing the door under the control of the processor 170. In response to the load weight changing, the robot 100 may determine the loading space, the door of which is opened and closed, to be the loading position of the article. The robot 100 may determine the change in the load weight to be the weight information of the article.

Hereinafter, an exemplary process of determining the weight information of an article will be described with reference to FIG. 10.

Figure 10:
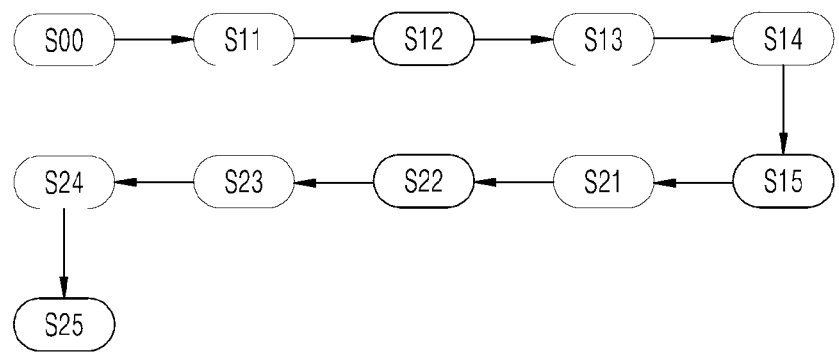
FIG. 10 is a diagram illustrating a weight determination process according to an embodiment of the present disclosure.

FIG. 10 is a diagram illustrating the weight determination process according to an embodiment of the present disclosure.

Step S00 is a state in which there is no article loaded on the robot 100 and the load weight is thus 0 kg. The robot 100 manages the position in the loading space for which there is an open door and the change in the load weight in order to determine the weight of the article.

In step S11, the robot 100 determines to load an article A in the first loading space and opens the door of the first loading space. In step S12, the robot 100 recognizes that the position at which a door is currently open is the first loading space. In step S13, the article A is loaded in the first loading space. In step S14, the robot 100 closes the door of the first loading space. In step S15, the robot 100 detects the load weight and determines the weight of the loaded article. For example, when the load weight is 5 kg, the robot 100 may recognize that the weight of the article A loaded in the first loading space is 5 kg.

Subsequently, in step S21, the robot 100 determines to load an article B in the second loading space and opens the door of the second loading space. In step S22, the robot 100 recognizes that the position at which a door is currently open is the second loading space. In step S23, the article B is loaded in the second loading space. In step S24, the robot 100 closes the door of the second loading space. In step S25, the robot 100 detects the load weight and determines the weight of the loaded article. For example, when the load weight is 8 kg, the robot 100 recognizes that the weight of the article B loaded in the second loading space is 3 kg. That is, in step S25, the robot 100 may recognize the value obtained by subtracting 5 kg, which is the load weight before loading the article B (for example, the load weight detected in step S15), from 8 kg, which is the load weight after loading the article B, as the weight of the article B. According to this weight measurement method, it is possible to measure the weights of articles respectively loaded in the plurality of loading spaces using only a single weight sensor, and manufacturing costs may thus be reduced.

Referring back to FIG. 3, in step S530, the robot 100 may determine a route along which the robot 100 is to visit a plurality of destinations based on the weight information of the article determined in step S520 under the control of the processor 170.

The robot 100 may load a plurality of articles, which needs to be delivered to different destinations, in a container, and may visit a plurality of destinations. The robot 100 may determine an optimal route along which the robot 100 is to visit a plurality of destinations based on the amount of power expected to be consumed for delivery.

The robot 100 stores destination information of the article loaded in the container in the memory 160, and manages the same under the control of the processor 170. The destination information may include outdoor place information at which the destination is located, distance-to-destination information, and indoor location information. The robot 100 may use the destination information in order to search for a route along which the robot 100 is to visit a plurality of destinations.

For example, the outdoor place information may include address information and location coordinates of the destination. For example, the indoor location information may include information about a floor on which the destination is located, and moving distance information to the destination on the corresponding floor. For example, the moving distance information on the corresponding floor refers to the moving distance from the elevator boarding area on the corresponding floor to the destination.

In step S530, the robot 100 may determine a route along which the robot 100 is to visit a plurality of destinations based on the weight information of the article determined in step S520 under the control of the processor 170. In one example, the robot 100 may determine the next destination to visit among the plurality of destinations. In one example, the robot 100 may determine the next destination to visit among the plurality of destinations before departure. In one example, the robot 100 may predetermine the order in which the robot 100 is to visit a plurality of destinations before departure.

In step S530, the robot 100 may obtain information on outdoor places at which a plurality of destinations is located using the processor 170, and may determine the order in which the robot 100 is to visit the outdoor places and the order in which the robot 100 is to visit a plurality of indoor points in the same outdoor place. Here, the outdoor place may correspond to a building. For example, the outdoor place may be a unit of a place in which the robot 100 is capable of accessing a plurality of points using one elevator.

The robot 100 may parse the address of the destination and may obtain information on the outdoor place at which the destination is located. For example, based on the address of the destination X being "1501ho 900dong Y Apartment", the robot 100 may parse the address of the destination X using the processor 170 and may obtain information that the place at which the destination X is located is "900dong Y Apartment". In addition, when the address of the destination Z is "102ho 900dong Y Apartment", the robot 100 may obtain information that the destination Z is located at the same building as the destination X.

Hereinafter, the process of determining the order in which the robot is to visit a plurality of outdoor places in step S530 will be described.

A plurality of destinations that the robot 100 will visit may include a first destination and a second destination. Here, the first destination and the second destination may be located at different outdoor places. For example, the first destination and the second destination may be located in different buildings.

Step S530 may include selecting the next destination based on distance-to-destination information.

In one example, the robot 100 may determine, as a next destination, a destination among the first destination and the second destination that is closer to the current location, using the processor 170. For example, in response to the distance from the current location to the first destination being shorter than the distance from the current location to the second destination, the first destination may be determined to be the next destination. Here, the distance to each destination is the distance of the movement route from the current location to each destination.

Step S530 may include selecting the next destination based on the weight information of the articles to be delivered.

In one example, the robot 100 may compare the weight of the article to be delivered to the first destination and the weight of the article to be delivered to the second destination using the processor 170, and may determine the next destination according to the comparison result. The robot 100 may first visit a place to which the heavier article is to be delivered. For example, the robot 100 may compare the weight of the article to be delivered to the first destination and the weight of the article to be delivered to the second destination, and may determine, as the next destination, the destination to which the article determined to be heavier according to the comparison result is to be delivered. In one example, in response to the distance to the first destination being the same as the distance to the second destination, the robot 100 may determine the next destination based on the weights of the articles to be delivered to the respective destinations.

In addition, a plurality of destinations that the robot 100 will visit may further include a third destination. Here, the third destination may be located at the same outdoor place as the first destination described above. For example, the first destination and the third destination may be located in a first building, and the second destination may be located in a second building that is different from the first building.

In one example, the robot 100 may compare the sum of the weight of the article to be delivered to the first destination and the weight of the article to be delivered to the third destination with the weight of the article to be delivered to the second destination, using the processor 170, and may determine the next destination according to the comparison result. For example, in response to the sum of the weight of the article to be delivered to the first destination and the weight of the article to be delivered to the third destination being greater than the weight of the article to be delivered to the second destination, the robot 100 may determine, as the next destination, the outdoor place at which the first destination and the third destination are located. Conversely, in response to the weight of the article to be delivered to the second destination being greater than the sum of the weight of the article to be delivered to the first destination and the weight of the article to be delivered to the third destination, the robot 100 may determine, as the next destination, the outdoor place at which the second destination is located. Hereinafter, the process of determining a route along which the robot 100 is to visit destinations located at different outdoor places will be exemplarily described with reference to FIG. 6.

Figure 6:
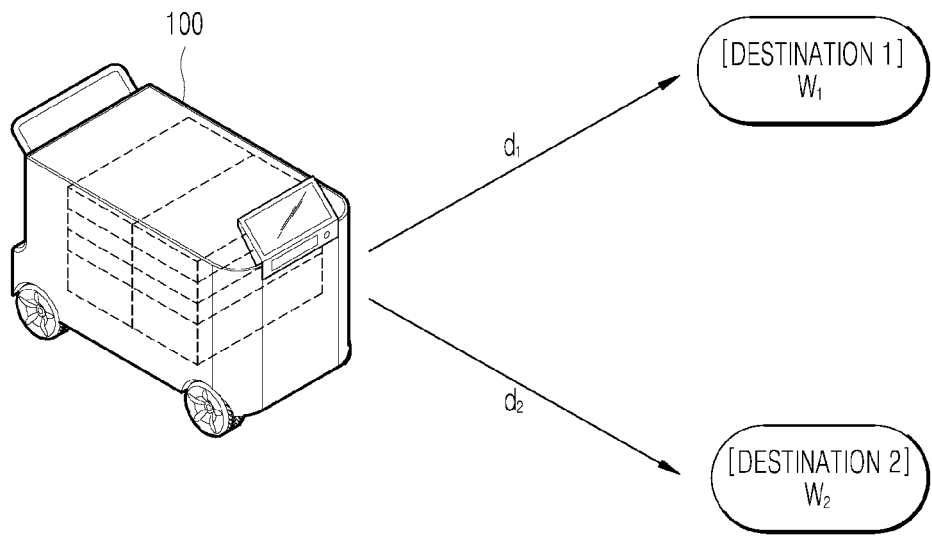
FIG. 6 is a diagram for illustrating a route determination process according to an embodiment of the present disclosure.

FIG. 6 is a diagram for illustrating the route determination process according to an embodiment of the present disclosure. FIG. 6 is a diagram illustrating a method for determining the next destination among a plurality of destinations located at different outdoor places.

A plurality of destinations that the robot 100 will visit may include a first destination and a second destination. For example, it is assumed that the first destination and the second destination are located at different outdoor places. Here, the distance to the first destination is $d_1$, and the weight of the article to be delivered to the first destination is $W_1$. Similarly, the distance to the second destination is $d_2$, and the weight of the article to be delivered to the second destination is $W_2$.

In one example, the robot 100 may determine, as the next destination, a destination among the first destination and the second destination that is closer to the current, using the processor 170. For example, when $d_1$ is 3 km and $d_2$ is 5 km, the robot 100 may determine the first destination, which is closer to the current location, to be the next destination.

In one example, the robot 100 may compare the weight of the article to be delivered to the first destination and the weight of the article to be delivered to the second destination using the processor 170, and may determine the next destination according to the comparison result. For example, the robot 100 may first visit a place to which the heavier article is to be delivered. For example, when $W_1$ is 5 kg and $W_2$ is 10 kg, the robot 100 may determine the second destination, to which the heavier article is to be delivered, to be the next destination. In one example, in response to the distance $d_1$ to the first destination being the same as the distance $d_2$ to the second destination, the robot 100 may determine the next destination based on the weights of the articles to be delivered to the respective destinations.

Referring back to FIG. 3, the process for determining the order in which the robot is to visit a plurality of indoor points in the same outdoor place in step S530 will be described below.

At least some of the plurality of destinations that the robot 100 will visit may be located at the same outdoor place. In step S530, the robot 100 may classify the destinations located at the same outdoor place into a plurality of vertical zones, which are set on the basis of a predetermined reference floor, based on the floor information of the destinations located at the same outdoor place using the processor 170, and may determine a delivery priority among a plurality of vertical zones based on the weights of the articles to be delivered to the respective vertical zones.

Here, the vertical zones are zones that are partitioned in the vertical direction on the basis of a predetermined reference floor. In one example, the reference floor may be a middle floor of a building. For example, a 20-floor building may be divided into a first vertical zone of the $10^{th}$ floor or lower, and a second vertical zone of $11^{th}$ floor or higher on the basis of the $10^{th}$ floor. In one example, the reference floor may be determined to be every $10^{th}$ floor. For example, a 30-floor building may be divided into a first vertical zone of the $10^{th}$ floor or lower, a second vertical zone from the $11^{th}$ floor to the $20^{th}$ floor, and a third vertical zone of $21^{st}$ floor or higher on the basis of the $10^{th}$ floor and the $20^{th}$ floor, which are the reference floors.

In step S530, the robot 100 may classify the destinations located at the same outdoor place into a plurality of vertical zones based on the floor information of the destinations located at the same outdoor place using the processor 170. For example, the robot 100 may determine a vertical zone to which each of the destinations located at the same outdoor place belongs. For example, when the first vertical zone is the zone of the $10^{th}$ floor or lower and the second vertical zone is the zone from the $11^{th}$ floor to the $20^{th}$ floor, a destination located on the $3^{rd}$ floor may be determined to belong to the first vertical zone, and a destination located on the $15^{th}$ floor may be determined to belong to the second vertical zone.

In step S530, the robot 100 may determine a delivery priority among the plurality of vertical zones based on the weights of the articles to be delivered to the respective vertical zones using the processor 170. Here, the delivery priority is a delivery order in which the articles are to be delivered to the vertical zones.

In one example, the robot 100 may determine the delivery priority according to the descending order of the weights of the articles to be delivered to the respective vertical zones using the processor 170. For example, in response to the weight of the article to be delivered to the first vertical zone being greater than the weight of the article to be delivered to the second vertical zone, the robot 100 may deliver the article to the first vertical zone prior to the second vertical zone.

The delivery direction in which the robot 100 delivers the articles in the corresponding outdoor place may be determined according to the delivery priority among the plurality of vertical zones. The robot 100 may take the elevator up to deliver the articles in the vertical zones, and may take the elevator down after completing the delivery. The delivery direction may include upward delivery in which the robot takes the elevator up to deliver the articles and downward delivery in which the robot takes the elevator down to deliver the articles.

For example, in the case in which the robot 100 delivers the articles to the first vertical zone, which is the zone from the 1$^{st}$ floor to the 10$^{th}$ floor, prior to the second vertical zone, which is the zone from the 11$^{th}$ floor to the 20$^{th}$ floor, according to the determined delivery priority between the vertical zones, the robot 100 may perform the upward delivery while taking the elevator up from the 1$^{st}$ floor, which is the lowest floor, to deliver the articles in the order of the first vertical zone and the second vertical zone. Conversely, in the case in which the robot 100 delivers the articles to the second vertical zone, which is located at a position higher than the first vertical zone, prior to the first vertical zone, the robot 100 may take the elevator up to the 20$^{th}$ floor, which is the highest floor, and may then perform the downward delivery while taking the elevator down to deliver the articles in the order of the second vertical zone and the first vertical zone.

As another example, the case in which a third vertical zone from the 21$^{st}$ floor to the 30$^{th}$ floor is further present will be described below. For example, based on the robot 100 delivering the articles in the order of the first vertical zone, the second vertical zone, and the third vertical zone, the robot 100 may perform the upward delivery while taking the elevator up from the 1$^{st}$ floor, which is the lowest floor, to deliver the articles in the order of the first vertical zone, the second vertical zone, and the third vertical zone. For example, based on the robot 100 delivering the articles in the order of the first vertical zone, the third vertical zone, and the second vertical zone, the robot 100 may perform the upward delivery while taking the elevator up from the lowest floor to deliver the articles in the order of the first vertical zone and the third vertical zone, and may then perform the downward delivery while taking the elevator down to deliver the articles to the second vertical zone. Hereinafter, the delivery priority among the vertical zones will be exemplarily described with reference to FIG. 7.

Figure 7:
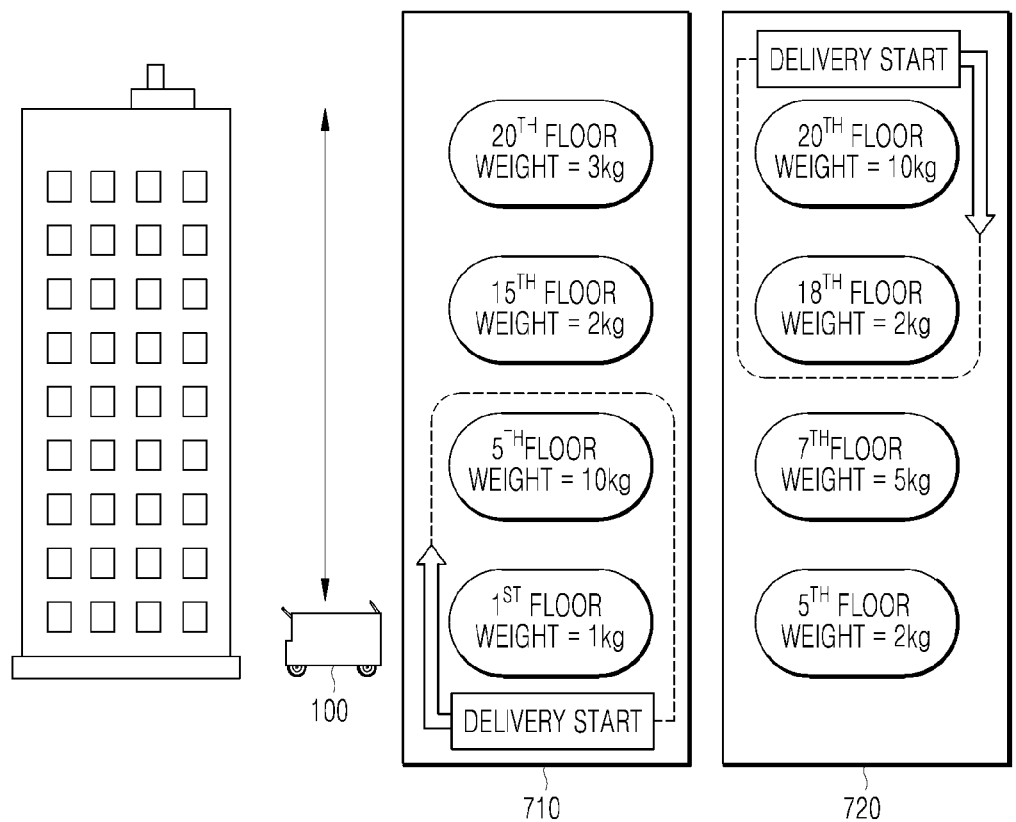
FIG. 7 is a diagram for illustrating a process of determining a delivery priority among vertical zones according to an embodiment of the present disclosure.

FIG. 7 is a diagram for illustrating the process of determining the delivery priority among the vertical zones according to an embodiment of the present disclosure. Referring to FIG. 7, four destinations are respectively located on different floors in the same building. The robot 100 may determine the delivery priority among the vertical zones in order to determine the route along which the robot 100 is to visit the respective destinations so as to deliver the articles in step S530 shown in FIG. 3. For example, it is assumed that four destinations are located in a 20-floor building and the reference floor is the 10$^{th}$ floor.

As indicated by the box 710 in FIG. 7, based on the destinations being respectively located on the 1$^{st}$ floor, the 5$^{th}$ floor, the 15$^{th}$ floor, and the 20$^{th}$ floor, the robot 100 may determine the vertical zone to which each of the destinations belongs on the basis of the 10$^{th}$ floor, which is the reference floor, according to the floor information of the respective destinations using the processor 170. That is, the 1$^{st}$ floor and the 5$^{th}$ floor may be determined to belong to the first vertical zone, and the 15$^{th}$ floor and the 20$^{th}$ floor may be determined to belong to the second vertical zone. Here, the total weight of the articles to be delivered to the first vertical zone is 11 kg, which is the sum of 1 kg, the weight of the article to be delivered to the 1$^{st}$ floor, and 10 kg, the weight of the article to be delivered to the 5$^{th}$ floor. The total weight of the articles to be delivered to the second vertical zone is 5 kg, which is the sum of 2 kg, the weight of the article to be delivered to the 15$^{th}$ floor, and 3 kg, the weight of the article to be delivered to the 20$^{th}$ floor. Since the total weight of the articles to be delivered to the first vertical zone is greater than the total weight of the articles to be delivered to the second vertical zone, the robot 100 may determine the delivery priority such that the robot 100 delivers the articles to the first vertical zone prior to the second vertical zone. Since the first vertical zone is located at a position lower than the second vertical zone in the vertical direction, the robot 100 may determine the delivery direction to be the upward delivery.

As indicated by the box 720 in FIG. 7, based on the destinations being respectively located on the 5$^{th}$ floor, the 7$^{th}$ floor, the 18$^{th}$ floor, and the 20$^{th}$ floor, the robot 100 may determine the vertical zone to which each of the destinations belongs on the basis of the 10$^{th}$ floor, which is the reference floor, according to the floor information of the respective destinations using the processor 170. That is, the 5$^{th}$ floor and the 7$^{th}$ floor may be determined to belong to the first vertical zone, and the 18$^{th}$ floor and the 20$^{th}$ floor may be determined to belong to the second vertical zone. Here, the total weight of the articles to be delivered to the first vertical zone is 7 kg, which is the sum of 2 kg, the weight of the article to be delivered to the 5$^{th}$ floor, and 5 kg, the weight of the article to be delivered to the 7$^{th}$ floor. The total weight of the articles to be delivered to the second vertical zone is 12 kg, which is the sum of 2 kg, the weight of the article to be delivered to the 18$^{th}$ floor, and 10 kg, the weight of the article to be delivered to the 20$^{th}$ floor. Since the total weight of the articles to be delivered to the second vertical zone is greater than the total weight of the articles to be delivered to the first vertical zone, the robot 100 may determine the delivery priority such that the robot 100 delivers the articles to the second vertical zone prior to the first vertical zone. Since the second vertical zone is located at a position higher than the first vertical zone in the vertical direction, the robot 100 may determine the delivery direction to be the downward delivery.

In step S530 shown in FIG. 3, when the delivery priority among the vertical zones is determined, the robot 100 may determine the movement route in each vertical zone using the processor 170.

In step S530, the robot 100 may determine the movement route in each vertical zone based on a delivery cost. Here, the delivery cost refers to the amount of work of the robot 100. In one example, the amount of work of the robot 100 may be determined according to the distance that the robot 100 has moved in order to deliver the articles and the load weight. Hereinafter, the process of determining a delivery cost will be exemplarily described with reference to FIG. 8.

Figure 8:
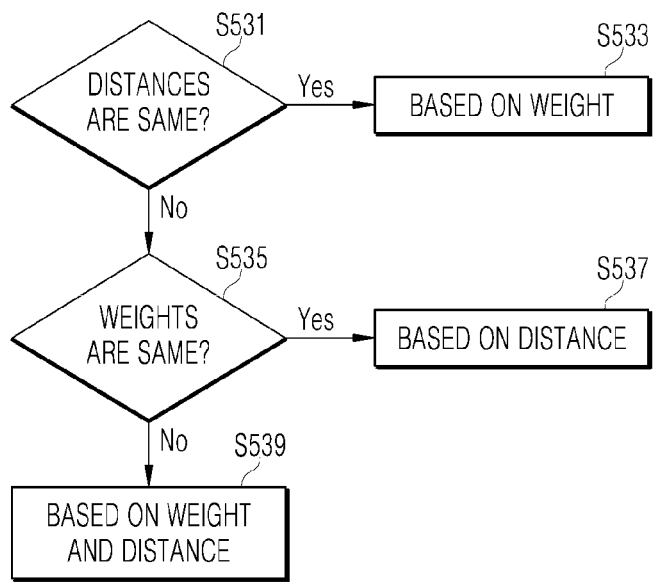
FIG. 8 is a flowchart of a delivery cost determination process according to an embodiment of the present disclosure.

FIG. 8 is a flowchart of the delivery cost determination process according to an embodiment of the present disclosure.

In step S531, the robot 100 determines whether the distances to the destinations belonging to the vertical zone, in which the vertical movement route needs to be determined, are the same, using the processor 170. Here, the distance to the destination is the horizontal moving distance from the elevator boarding area on each floor to the destination on the corresponding floor.

Upon determining that the horizontal moving distances are the same in step S531, the robot 100 determines the next destination based on the weights of the articles to be delivered to the destinations in step S533 using the processor 170. For example, the robot 100 first visits the floor to which the heavier article is to be delivered.

Upon determining that the horizontal moving distances are different in step S531, the robot 100 compares the weights of the articles to be delivered to the respective destinations belonging to the vertical zone in step S535 using the processor 170. In this case, the total weight of the articles to be delivered to each floor may be determined. For example, the robot 100 may compare the sum of the weights of the articles to be delivered to the destinations belonging to the same floor with the sum of the weights of the articles to be delivered to the destinations belonging to another floor.

Upon determining that the weights of the articles to be delivered are the same in step S535, the robot 100 may determine the next destination based on the horizontal moving distance from the elevator boarding position to each destination in step S537, using the processor 170.

Upon determining that the weights of the articles to be delivered are different in step S535, the robot 100 may determine a vertical movement route in the vertical zone based on the weights of the articles to be delivered and on the horizontal moving distance in step S539, using the processor 170. This will be described later with reference to FIG. 9.

Upon determining that the weights of the articles to be delivered are the same in step S535 and that the horizontal moving distances are the same in step S537, the robot 100 may determine the floor that is closest to the current location to be the next destination, using the processor 170. For example, when the destinations are located on the 5$^{th}$ floor, the 6$^{th}$ floor, and the 9$^{th}$ floor within the current vertical zone, and when the horizontal moving distances and the weights of the articles to be delivered on each floor are the same, if the current location of the robot 100 is the 8$^{th}$ floor, the 9$^{th}$ floor may be determined to be the next destination.

Step S530 described with reference to FIG. 3 may include step S531 to step S539 described with reference to FIG. 8.

Hereinafter, the vertical movement route determination process based on the delivery cost will be described with reference to FIG. 9. In step S539 shown in FIG. 8, the robot 100 may determine the vertical movement route within the vertical zone based on the weights of the articles to be delivered and the horizontal moving distances, using the processor 170.

Figure 9:
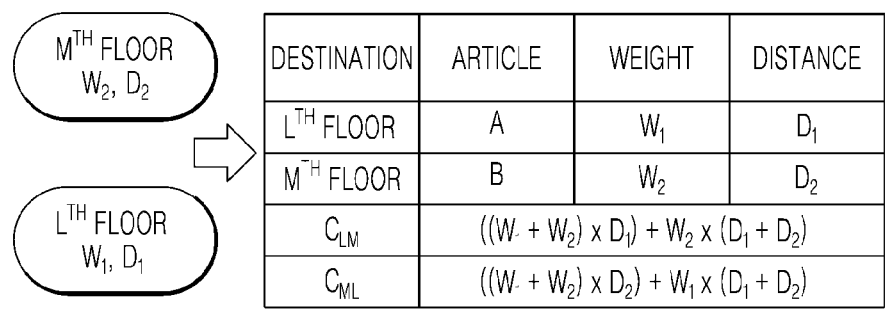
FIG. 9 is a table for illustrating a delivery cost determination process according to an embodiment of the present disclosure.

FIG. 9 is a table for illustrating the delivery cost determination process according to an embodiment of the present disclosure.

Based on at least some of the destinations being located on a plurality of floors in the same outdoor place, in step S530, the robot 100 may generate a plurality of vertical movement routes along which the robot 100 is to visit the plurality of floors using the processor 170 (step 1), may determine the delivery cost in each vertical movement route based on the visit order along each vertical movement route (step 2), and may determine a final vertical movement route among the plurality of vertical movement routes based on the delivery cost (step 3).

That is, the plurality of destinations that the robot 100 will visit may include a first destination and a third destination, which is located at the same outdoor place as the first destination but is located on a different floor from the first destination. Step S530 may include generating a plurality of vertical movement routes along which the robot 100 is to visit the first destination and the third destination (the aforementioned step 1), determining the delivery cost in each vertical movement route based on the visit order along each vertical movement route (the aforementioned step 2), and determining a final vertical movement route among the plurality of vertical movement routes based on the delivery cost (the aforementioned step 3).

In FIG. 9, it is assumed that the first destination and the second destination among a plurality of destinations are located at the same outdoor place. The first destination is located on the L$^{th}$ floor, and the second destination is located on the M$^{th}$ floor.

In step 1, the robot 100 may generate a plurality of vertical movement routes in order to visit a plurality of floors using the processor 170. Here, the vertical movement routes refer to the order in which the robot 100 is to visit the floors. The plurality of vertical movement routes along which the robot 100 is to visit the plurality of floors may be determined as a permutation of the order in which the robot 100 is to visit the plurality of floors. For example, in order for the robot 100 to visit the 1$^{st}$ floor, the 2$^{nd}$ floor, and the 5$^{th}$ floor, six vertical movement routes, such as 1-2-5, 1-5-2, 21-5, 2-1-5, 5-1-2, and 5-2-1, may be generated. For example, in order for the robot 100 to visit the L$^{th}$ floor and M$^{th}$ floor, two vertical movement routes, such as L-M and M-L, may be generated.

In step 2, the robot 100 may determine the delivery cost in each vertical movement route based on the visit order along each vertical movement route among the plurality of vertical movement routes generated in step 1. That is, the robot 100 may determine the delivery cost in the vertical movement route along which the robot 100 is to move in the order of L-M and the delivery cost in the vertical movement route along which the robot 100 is to move in the order of M-L. Here, the delivery cost refers to the amount of work of the robot required to deliver the articles.

Step 2 may include determining the delivery cost in each vertical movement route based on the horizontal moving distance according to the visit order and the load weight. That is, in step 2, the robot 100 may determine the delivery cost in each vertical movement route based on the horizontal moving distance according to the visit order and the load weight using the processor 170. For example, the robot 100 may determine the sum of the values, each of which is obtained by multiplying the horizontal moving distance by the load weight on each floor, to be the delivery cost. This may correspond to step S539 described with reference to FIG. 8.

In the example shown in FIG. 9, it is assumed that the weight of the article A to be delivered to the L$^{th}$ floor, on which the first destination is located, is W$_1$ and the horizontal moving distance on the L$^{th}$ floor from the elevator boarding point on the L$^{th}$ floor to the first destination is D$_1$. Similarly, it is assumed that the weight of the article B to be delivered to the M$^{th}$ floor, on which the second destination is located, is W$_2$ and the horizontal moving distance on the M$^{th}$ floor from the elevator boarding point on the M$^{th}$ floor to the second destination is D$_2$.

The delivery along the L-M vertical movement route will now be described. In the state in which the article A and the article B (the load weight=W$_1$+W$_2$) are loaded therein, the robot 100 moves the horizontal moving distance D$_1$ on the L$^{th}$ floor to reach the first destination, and unloads the article A. Subsequently, in the state in which the article B (the load weight=W$_2$) is loaded therein, the robot 100 again moves the horizontal moving distance D$_1$ on the L$^{th}$ floor to return to the elevator, vertically moves to the M$^{th}$ floor, moves the horizontal moving distance D$_2$ on the M$^{th}$ floor to reach the second destination, and unloads the article B.

The delivery cost C$_{LM}$ in the L-M vertical movement route according to the above series of processes may be expressed using the following equation.

$$C_{LM}=((W_1+W_2)\times D_1)+W_2\times(D_1+D_2)$$

In a similar manner, the delivery cost C$_{ML}$ in the M-L vertical movement route may be expressed using the following equation.

$$C_{ML}=((W_1+W_2)\times D_2)+W_1\times(D_1+D_2)$$

In step 3, the robot 100 determines a vertical movement route having the minimum delivery cost determined in step 2 among the plurality of vertical movement routes generated in step 1 to be the final vertical movement route, using the processor 170. For example, when $C_{LM}$ is less than $C_{ML}$, the robot 100 may determine the final vertical movement route such that the robot 100 visits the $L^{th}$ floor prior to the $M^{th}$ floor.

When a plurality of destinations is present on each floor, the horizontal movement route on the corresponding floor may be determined in a manner similar to the route determination process described above with reference to FIG. 6. For example, the robot 100 may determine the next destination based on the distances to the plurality of destinations located on the same floor using the processor 170. For example, the robot 100 may first visit a destination that is relatively close thereto. In response to the distances to the plurality of destinations being the same, the robot 100 may determine the next destination based on the weights of the articles to be delivered to the plurality of destinations located on the same floor using the processor 170. For example, in response to the distances to the plurality of destinations being the same, the robot 100 may first deliver a relatively heavy article.

In addition, the delivery method of the robot 100 according to the embodiment may further include storing the travel result of travelling along the route determined in step S530 in the memory 160 under the control of the processor 170. Here, the travel result may include the route information determined in step S530 and information on the time actually taken for travel. Here, the route information may include a visit order with respect to a plurality of destinations, a delivery priority with respect to a plurality of vertical zones, a final vertical movement route, a horizontal moving distance, and a change in the load weight.

According to the above-described route determination method, the embodiment is capable of determining a delivery priority and setting an effective movement route so as to optimize the amount of power consumption in consideration of the weights of the articles loaded in the robot.

In addition, the delivery method according to the embodiment may further include learning a route according to the travel result described above. In order to learn the route, the robot 100 may train the route-trained model based on an artificial neural network by providing the learning processor 130 with the travel result stored in the memory 160 under the control of the processor 170. The trained route-trained model may be used in the process of determining a route along which the robot is to visit a plurality of destinations in step S530.

Figure 11:
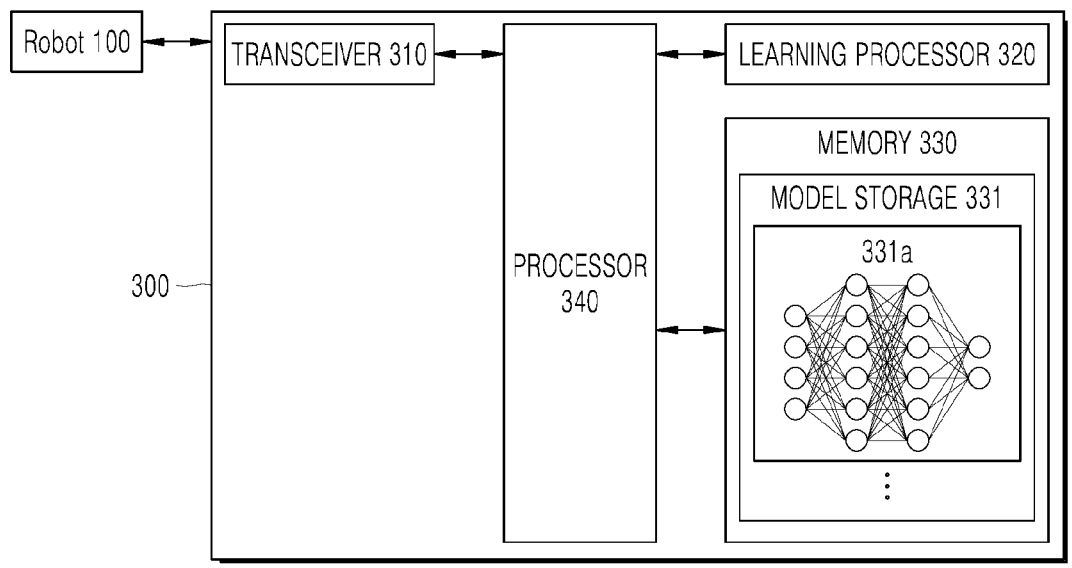
FIG. 11 is a block diagram of a server according to an embodiment of the present disclosure.

FIG. 11 is a block diagram of a server according to an embodiment of the present disclosure.

The server 300 may refer to a control server for controlling the robot 100. The server 300 may be a central control server for monitoring a plurality of robots 100. The server 300 may store and manage state information of the robot 100. For example, the state information may include location information, operation mode, driving route information, past delivery history information, and residual battery quantity information.

The server 300 may determine a robot 100 that is capable of processing a delivery request by the user. In this case, the server 300 may consider the state information of the robot 100. For example, the server 300 may determine an idle robot that is closest to the user or a robot 100 that passes by the user along the delivery route to be the robot 100 that is capable of processing the delivery request. The server 300 may determine a robot 100 that is capable of processing the delivery request in consideration of delivery history information. For example, the server 300 may determine a robot 100 that has successfully delivered an article to the corresponding destination to be the robot 100 that is capable of processing the delivery request.

The server 300 may refer to a device for training an artificial neural network using a machine learning algorithm or using a trained artificial neural network. Here, the server 300 may include a plurality of servers to perform distributed processing, or may be defined as a 5G network. The server 300 may also be included as a configuration of a portion of an AI device, such as the robot 100, to thereby perform at least some of the AI processing together with the AI device.

The server 300 may include a transceiver 310, a memory 330, a learning processor 320, and a processor 340.

The transceiver 310 may transmit and receive data to and from an external device, such as the robot 100.

The memory 330 may include a model storage 331. The model storage 331 may store a model (or an artificial neural network 331a) that is being trained or has been trained via the learning processor 320.

The learning processor 320 may train the artificial neural network 331a by using learning data. The trained model may be used while mounted in the server 300 of the artificial neural network, or may be used while mounted in an external device such as the robot 100. For example, the trained model may be mounted in the server 300 or mounted in the robot 100 so as to be used to determine the loading characteristics of an article. For example, the trained model may be mounted in the server 300 or mounted in the robot 100 so as to be used to determine an optimal route.

The trained model may be implemented as hardware, software, or a combination of hardware and software. When a portion or the entirety of the trained model is implemented as software, one or more instructions, which constitute the trained model, may be stored in the memory 330.

The processor 340 may infer a result value with respect to new input data using the trained model, and generate a response or control command based on the inferred result value.

The example embodiments described above may be implemented through computer programs executable through various components on a computer, and such computer programs may be recorded on computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

While the specific exemplary embodiments of the present disclosure have been described above and illustrated, it will be understood by those skilled in the art that the present disclosure is not limited to the described exemplary embodiments, and various modifications and alterations may be made without departing from the spirit and the scope of the present disclosure. Therefore, the scope of the present disclosure is not limited to the above-described exemplary embodiments, but shall be defined by the technical thought as recited in the following claims.

What is claimed is:

1. A robot comprising:
a container comprising at least one loading space;
a load sensor configured to detect a load weight of the container;
a camera configured to capture images of articles;
a memory configured to store weight information of the articles loaded in the loading space; and
a processor,
wherein the processor is configured to:
determine the weight information based on the load weight;
determine loading characteristics of the articles based on the captured images of the articles;
determine a loading space among a plurality of loading spaces for loading the articles based on the loading characteristics to stably transport the articles;
open the determined loading space; and
determine a route along which the robot is to visit a plurality of destinations based on the weight information, including:
determining whether horizontal moving distances to the plurality of destinations are the same;
in response to the horizontal moving distances to the plurality of destinations being the same, determining a next destination based on weights of the articles to be delivered to each of the plurality of destinations;
in response to the horizontal moving distances to the plurality of destinations being different and the weights of the articles to be delivered to each of the plurality of destinations being the same, determining the next destination based on the horizontal moving distances to the plurality of destinations; and
in response to the horizontal moving distances to the plurality of destinations being different and the weights of the articles to be delivered to each of the plurality of destinations being different, determining the next destination based on the horizontal moving distances to the plurality of destinations and the weights of the articles.

2. The robot of claim 1, wherein the processor is further configured to re-determine the loading space in which to load the articles, based on the weight information.

3. The robot of claim 1, wherein each of the plurality of loading spaces comprises at least one door, and
wherein the processor is further configured to:
determine a change in the load weight before opening the door and after closing the door;
in response to the change in the load weight, determine the loading space of which the door was opened and closed to be a loading position of the articles; and
determine the change in the load weight to be the weight information of the articles.

4. The robot of claim 1, wherein the load sensor is disposed at a bottom of the container.

5. The robot of claim 1, wherein the memory is further configured to store destination information of the loaded articles, and
wherein the destination information comprises information of an outdoor place at which the at least one of the destinations is located, information of a floor on which the at least one of the destinations is located, and information about a distance to the at least one of the destinations.

6. The robot of claim 1, wherein the plurality of the destinations comprises a first destination and a second destination located at a different outdoor place from the first destination, and
wherein the processor is further configured to determine another next destination that is closer to a current location among the first destination and the second destination.

7. The robot of claim 1, wherein the articles includes a first article, a second article and a third article,
wherein the plurality of destinations further comprises a third destination located at a same outdoor place as the first destination, and
wherein the processor is further configured to:
compare a sum of a weight of the first article and a weight of the third article to be delivered to the third destination with a weight of the second article; and
determine another next destination based on a comparison result.

8. The robot of claim 1, wherein at least two of the plurality of the destinations are located at a same outdoor place, and
wherein the processor is further configured to:
classify the at least two of the plurality of the destinations into a plurality of vertical zones based on floor information of the destinations located at the same outdoor place, the vertical zones being set based on a predetermined reference floor; and
determine a delivery priority among the plurality of vertical zones based on weight of each article to be delivered to respective vertical zones.

9. The robot of claim 1, wherein at least two of the plurality of the destinations are located on different floors in a same outdoor place, and
wherein the processor is further configured to:
generate a plurality of vertical movement routes along which the robot is to visit the floors;
determine a delivery cost for each of the vertical movement routes based on a visit order along each of the vertical movement routes; and
determine a final vertical movement route among the plurality of vertical movement routes based on the delivery cost.

10. The robot of claim 9, wherein the processor is further configured to determine the delivery cost for each of the vertical movement routes based on the load weight and a horizontal moving distance according to the visit order.

11. The robot of claim 1, wherein the determining of the loading characteristics includes using an article-recognizing model stored in memory of the robot, and
wherein the loading characteristics includes a type of the articles and care and handling of the articles.

12. A method for delivering articles using a robot, the method comprising:
capturing images of the articles, by a camera of the robot;
determining loading characteristics of the articles based on the captured images of the articles to stably transport the articles;
determining a loading space among a plurality of loading spaces for loading the articles based on the loading characteristics;
opening the determined loading space;
loading the articles into the determined loading space of the robot;
determining, by a load sensor of the robot, a load weight of the container;
determining weight information of the articles based on the load weight; and
determining a route along which the robot is to visit a plurality of destinations based on the weight information of the articles, including:
determining whether horizontal moving distances to the plurality of destinations are the same;
in response to the horizontal moving distances to the plurality of destinations being the same, determining a next destination based on weights of the articles to be delivered to each of the plurality of destinations;
in response to the horizontal moving distances to the plurality of destinations being different and the weights of the articles to be delivered to each of the plurality of destinations being the same, determining the next destination based on the horizontal moving distances to the plurality of destinations; and
in response to the horizontal moving distances to the plurality of destinations being different and the weights of the articles to be delivered to each of the plurality of destinations being different, determining the next destination based on the horizontal moving distances to the plurality of destinations and the weights of the articles.

13. The method of claim 12, wherein the determining weight information comprises determining the weight information of the articles according to a change in the load weight before and after loading the articles.

14. The method of claim 12, wherein the plurality of the destinations further includes a third destination located at a same outdoor place as the first destination but on a different floor from a floor on which the first destination is located, and
wherein the determining the route further comprises:
generating a plurality of vertical movement routes along which the robot is to visit the first destination and the third destination;
determining a delivery cost for each of the vertical movement routes based on a visit order along each of the vertical movement routes; and
determining, based on the delivery cost, a final vertical movement route among the plurality of vertical movement routes.

15. The method of claim 14, wherein the determining a delivery cost comprises determining the delivery cost for each of the vertical movement routes based on the load weight and a horizontal moving distance according to the visit order.

16. The method of claim 12, wherein the determining of the loading characteristics includes using an article-recognizing model stored in memory of the robot, and
wherein the loading characteristics includes a type of each of the articles and care and handling of the articles.

* * * * *